(12) United States Patent
Lu et al.

(10) Patent No.: US 10,534,353 B2
(45) Date of Patent: Jan. 14, 2020

(54) SYSTEM AND METHOD TO REDUCE PRE-BACK-GRINDING PROCESS DEFECTS

(71) Applicant: TAIWAN SEMICONDUCTOR MANUFACTURING COMPANY, LTD., Hsinchu (TW)

(72) Inventors: Chen-Fa Lu, Gangshan Township (TW); Cheng-Ting Chen, Taichung (TW); James Hu, Hsinchu (TW); Chung-Shi Liu, Shin-Chu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/045,440

(22) Filed: Oct. 3, 2013

(65) Prior Publication Data
US 2014/0039661 A1 Feb. 6, 2014

Related U.S. Application Data

(63) Continuation of application No. 12/879,278, filed on Sep. 10, 2010, now Pat. No. 8,571,699.

(51) Int. Cl.
*G05B 19/418* (2006.01)

(52) U.S. Cl.
CPC .............. *G05B 19/41875* (2013.01)

(58) Field of Classification Search
CPC ........... H01L 21/67132; H01L 21/6836; B24B 7/228; B24B 37/005; G05B 19/41875; G05B 19/41815
USPC ......................................................... 700/175
See application file for complete search history.

(56) References Cited

U.S. PATENT DOCUMENTS

| | | | | |
|---|---|---|---|---|
| 5,637,177 A * | 6/1997 | Os | ................................ | 156/286 |
| 5,827,111 A * | 10/1998 | Ball | ................................ | 451/14 |
| 6,258,198 B1* | 7/2001 | Saito et al. | .................... | 156/229 |
| 6,428,641 B1* | 8/2002 | Yoon et al. | ...................... | 156/64 |
| 6,572,444 B1* | 6/2003 | Ball et al. | ........................ | 451/10 |
| 6,845,695 B2* | 1/2005 | Peng | ................. | H01L 21/67132 |
| | | | | 156/267 |
| 7,530,880 B2* | 5/2009 | Bajaj et al. | ........................ | 451/5 |
| 2003/0224581 A1* | 12/2003 | Lutz et al. | ..................... | 438/455 |
| 2005/0085008 A1* | 4/2005 | Derderian et al. | ............ | 438/106 |

(Continued)

FOREIGN PATENT DOCUMENTS

TW 200626292 8/2006

OTHER PUBLICATIONS

Taiwan Office Action dated Jul. 16, 2013.

(Continued)

*Primary Examiner* — Ryan A Jarrett
(74) *Attorney, Agent, or Firm* — Hauptman Ham, LLP (57) ABSTRACT

A system for reducing processing defects during processing of a semiconductor wafer prior to back-grinding the wafer includes a table having one or more holes formed therein, wherein the table comprises at least one of a chuck table or a support table, wherein the holes are perpendicular to the surface upon which a pre-back-grinding (PBG) process occurs. The system further includes one or more sensors disposed in said holes for monitoring a parameter during the PBG process. The system further includes a computer-implemented process control tool coupled with the one or more sensors and configured to determine whether the PBG process will continue.

20 Claims, 7 Drawing Sheets

(56) References Cited

U.S. PATENT DOCUMENTS

| | | | | |
|---|---|---|---|---|
| 2005/0282362 A1* | 12/2005 | Kobayashi | ........ | H01L 21/67132 |
| | | | | 438/464 |
| 2007/0284028 A1* | 12/2007 | Kawashima et al. | ........... | 156/64 |
| 2010/0059183 A1* | 3/2010 | Lin et al. | ...................... | 156/351 |
| 2010/0259183 A1 | 3/2010 | Lin et al. | | |
| 2011/0290415 A1* | 12/2011 | George | ............. | H01L 21/67132 |
| | | | | 156/247 |

OTHER PUBLICATIONS

Sharon Lim Pei-Siang, Gaurav Shama, Aditya Kumar, Vempati Srinivasa Rao, Vincent Lee Wen Sheng. "Characterization of DAF tape for Embedded Micro Wafer Level Packaging", Institute of Microelectronics, A Star, 2009 11th Electronics Package Technology Conference.

\* cited by examiner

SYSTEM AND METHOD TO REDUCE PRE-BACK-GRINDING PROCESS DEFECTS

PRIORITY CLAIM

The present application is a continuation of U.S. application Ser. No. 12/879,278, filed Sep. 10, 2010, which is incorporated here by reference in its entirety.

BACKGROUND

The continued scaling of semiconductor devices to ever smaller dimensions creates a number of manufacturing challenges. One process related to this trend involves the production of very thin wafers used in integrated circuit (IC) fabrication. Some current approaches in the semiconductor industry use "back-grinding" of integrated circuit wafers (also referred to as semiconductor wafers) to reduce their thickness. This practice involves the completion of the front or active side of a wafer, and the subsequent removal of excess substrate from the back side of the wafer.

After formation of the active circuits on the front side of a wafer, one of two processes take place. If the wafer is processed using a flip chip ball grid array (FCBGA) based method, the circuits are covered with laminating tape and the process continues with the back-grinding. If a carrier bond process for through silicon vias (TSV) is used, then a carrier wafer is bonded to the integrated circuit wafer with an adhesive before back-grinding excess substrate.

Using each of these methods is not without drawbacks, as defects can occur during the steps for protecting the active circuitry. For instance, if taping is used in an FCBGA process, then taping pressure and speed are a concern. If the pressure and/or speed are not correct, bubbling of tape can cause impurities to remain on the wafer. Improper taping can also lead to breakage of the wafer during the back-grinding process. Using a TSV method, improper pressures during application of the adhesive and carrier wafer can again lead to problems during back-grinding, such as wafer warpage and breakage.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

The below descriptions describe embodiments of systems and methods for reducing defects arising during processing of semiconductor wafers during preparation for back-grinding processes. The use of an embodiment or one embodiment is not intended to convey that the descriptions pertain to a single embodiment, but that the features described are present in at least one implementation. Like features will generally be referred to with like reference numerals, but this is also not intended to denote a requirement that the same features appear in each embodiment. Also, features depicted in the figures are not drawn to scale and therefore should not be construed to place particular size limitations on the systems described.

Figure 1:
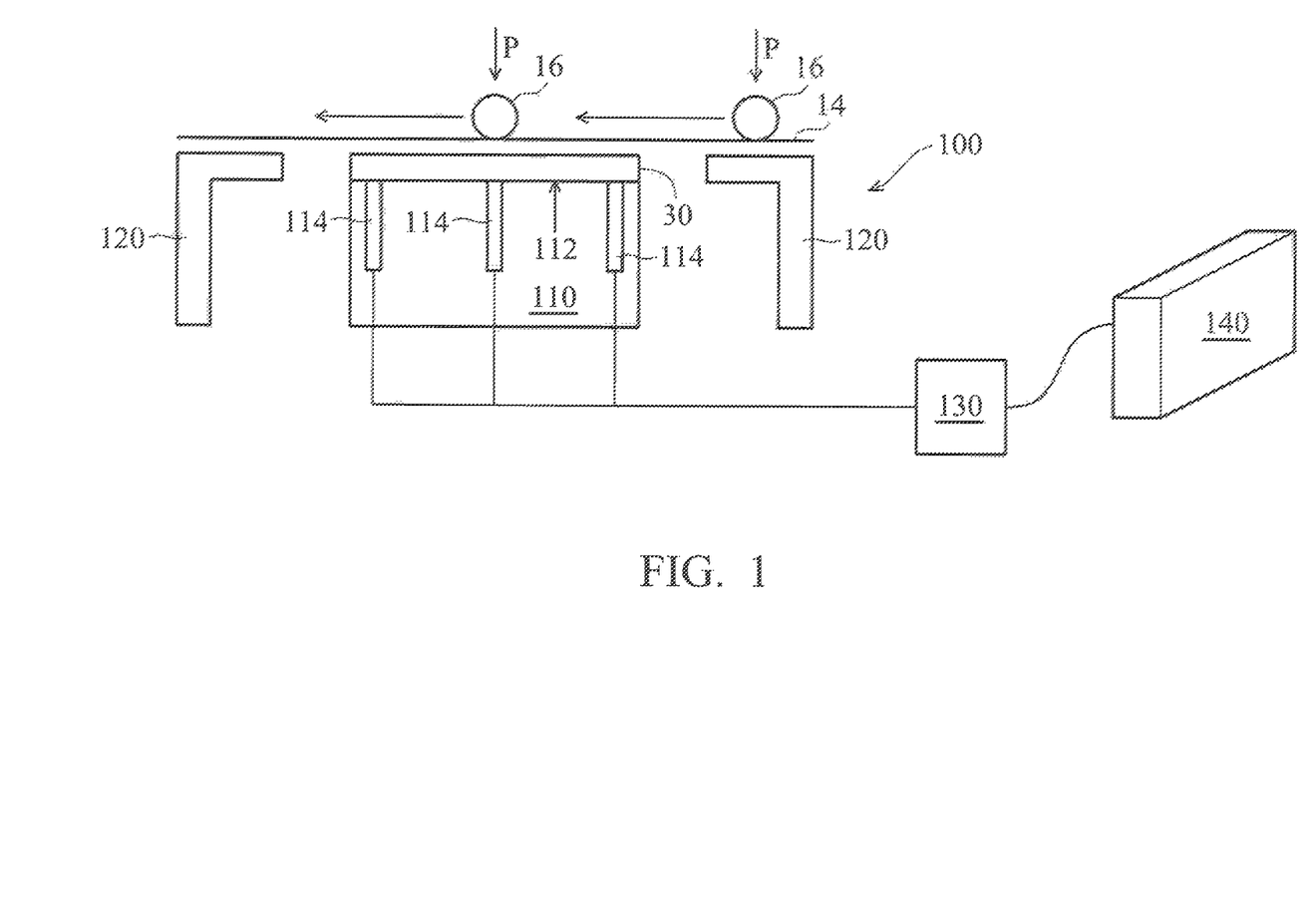
FIG. 1 is a high-level diagram of a system for reducing processing defects to a semiconductor wafer in a chip scale packaging (CSP) process according to an embodiment.

FIG. 1 is a high-level diagram of a flip chip ball grid array (FCBGA) system 100 for reducing processing defects arising during a chip scale packaging (CSP) process according to an embodiment of the present disclosure. System 100 is used in conjunction with a tape lamination apparatus, only portions of which are reproduced so as not to obscure the depicted embodiment. The tape lamination apparatus includes back-grinding (BG) lamination tape 14, which a roller 16 applies to a semiconductor wafer 30. During application of tape 14 to wafer 30, roller 16 moves across the wafer applying a pressure (generally identified by reference character P) to the wafer through application of the lamination tape.

A chuck table 110 supports, either directly or indirectly, semiconductor wafer 30 during the tape application process. The back side of wafer 30 rests upon chuck table 110 approximate an upper surface 112. Support tables 120, positioned on one or both sides of chuck table 110, ensure that roller 16 is positioned properly to apply BG tape 14 to the front side or active surface of wafer 30. The inventors have found processing defects such as bubbling of BG tape 14 or warpage of wafer 30 can occur if pressure P is not within an acceptable or predetermined range of values. Likewise, if roller 16 does not move at a predetermined speed during the tape lamination process, similar defects can arise.

Chuck table 110 comprises at least one hole, e.g., three holes formed therein which extend perpendicularly from an upper surface 112 of the table, i.e., the surface upon which semiconductor wafer 30 is placed. Pressure sensors 114 are respectively positioned within each hole to measure the pressure P applied to wafer 30 by the roller 16 during the taping process. For example, sensors 114 could be a Baratron® pressure transducer as produced by MKS Instruments of Andover, Mass. Sensors 114 are placed toward the edges of chuck table 110 and at the center of the table.

In differing embodiments, chuck table 110 comprises a greater or a fewer number of holes and/or sensors 114. In still other embodiments, sensors 114 are placed toward the edge, midpoint, and center of chuck table 110, in order to measure the pressure of the rollers on the wafer throughout the application of the lamination tape on the wafer. In at least some other embodiments, sensors 114 are formed as an integral part of chuck table 110 or supporting table 120. Other configurations of sensor placement and/or hole formation are possible and will be apparent to one of ordinary skill in the art based on the present disclosure.

Figure 2:
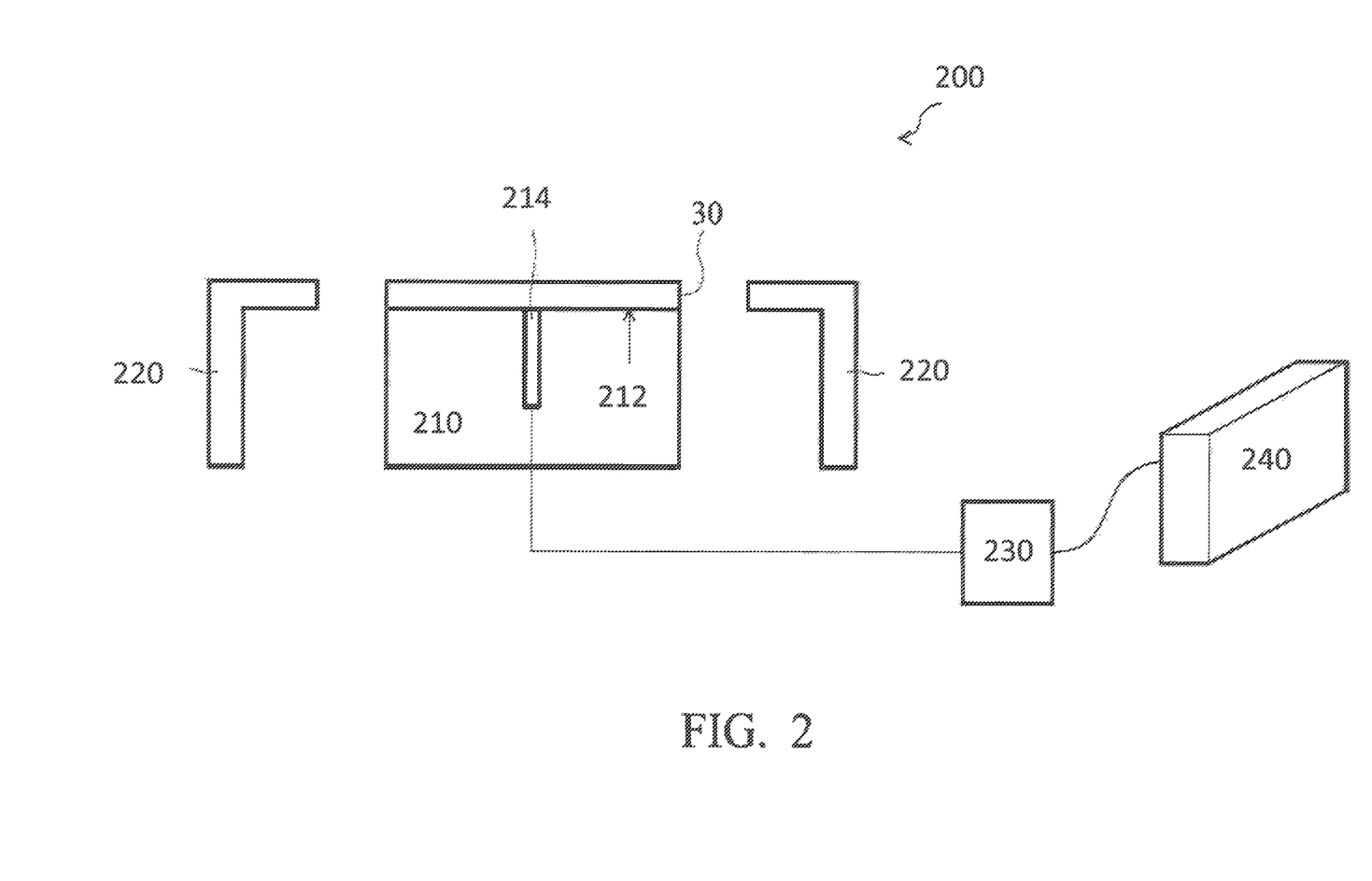
FIG. 2 is a high-level diagram of a system for reducing processing defects to a semiconductor wafer in a CSP process according to another embodiment.

In at least one embodiment, computer numerical control (CNC) lathes bore a series of holes into chuck table 110 of system 100. FIG. 2 is a high-level diagram of another embodiment, in which a CNC lathe bores a single hole into a chuck table 210 perpendicular to a surface of the table 212. Supporting tables 220 are similar to supporting tables 120 described above. A pressure sensor 214 is a single sensor in the center of the chuck table 210. In yet further embodiments, a hole or series of holes may be defined in a chuck table during manufacture of the table. System 200 includes a control box 230 and a computer process control tool 240, that are similar to control box 130 and computer process control tool 140 described in further detail below.

Returning to FIG. 1, pressure sensors 114 are communicatively coupled to a control box 230 which translates received sensor signals into a form directly usable by a computer monitoring process tool 140. For example, control box 130 converts received sensor signals from the pressure sensors from a voltage measurement into a digital output value. In some embodiments, sensors 114 are pressure transducers that generate pressure reading measurements within one newton (N) of precision. Control box 130 converts readings ranging from 10 N to 200 N into a digital representation. In other embodiments, sensors 114 have different levels of precision or detect pressure values over different ranges. Likewise, in some embodiments, control box 130 converts received sensor signals over a different range of values. In still other embodiments, pressure transducers produce a current measurement, rather than a voltage, to control box 130 based on the measured pressure. In other embodiments, control box 130 is integrated with sensors 114. In still further embodiments, control box 130 is integrated with a computing system executing a computer process control tool 140, described in further detail below.

Computer process control tool 140 is a set of instructions for execution which comprise a computer-implemented statistical process control (SPC). A computing system (shown and described with respect to FIG. 6) executes the SPC, which is configured to monitor and control each step of a fabrication process. Some processes controlled by the SPC have parameters that are statistically based, e.g., an average value over time used to determine if the fabrication process is within a predetermined acceptable range of values. Other fabrication processes, such as the tape lamination process, operate on a predetermined threshold value or range of values. Computer process control tool 140 receives data from control box 130 and/or other tools and/or machines within a semiconductor fabrication facility. The SPC puts the measurements in a chain chart in order to monitor parameters during the fabrication process in an organized and inter-related manner. Thus, if any of the process parameters are not within specified predetermined limits, the monitored fabrication process is paused. For example, if the data received from control box 130 denotes a pressure reading that is too high or too low, the tape lamination process is halted for adjustment of the rollers.

Figure 3:
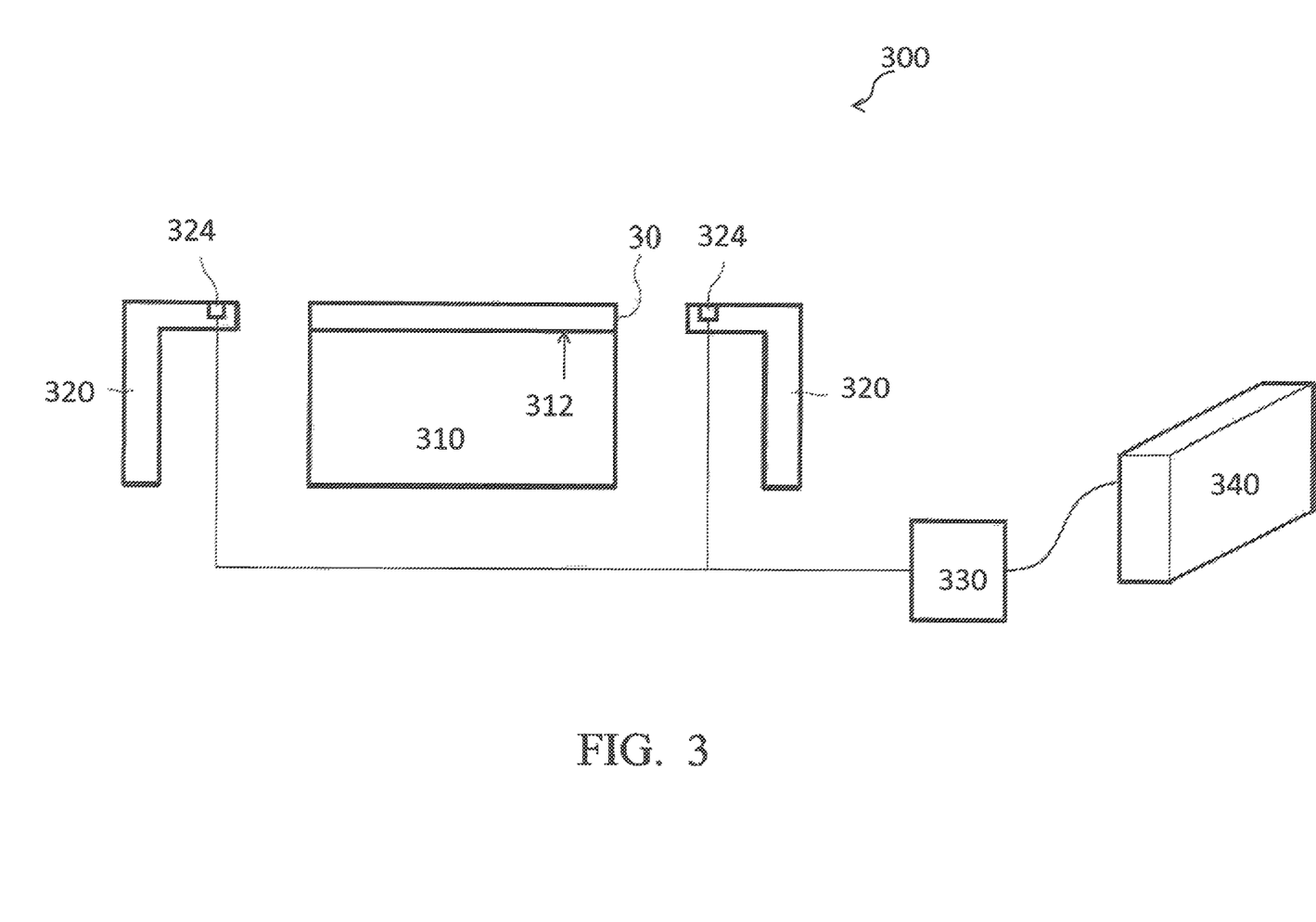
FIG. 3 is a high-level diagram of a system for reducing processing defects to a semiconductor wafer in a CSP process according to another embodiment.

FIG. 3 is a high-level diagram of a system 300 for reducing processing defects arising during processing of a semiconductor wafer in a CSP process according to another embodiment of the disclosure. System 300 comprises many similar features to system 100, including a chuck table 310, a support table 320, a control box 330, and a process control tool 340. However, in system 300, sensors 314 are disposed in support table 320. In some embodiments, sensors 324 are pressure transducers and placement of sensors 324 within support table 320 allows for measurement of the pressure applied by the tape laminating apparatus prior to actually placing the tape on the wafer. Although two sensors are shown, greater or fewer sensors are usable in different embodiments. In at least one embodiment, a single pressure sensor measures the applied pressure prior to or after tape application depending on the position of the support table with respect to the chuck table, i.e., in front of or behind the chuck table.

Figure 4:
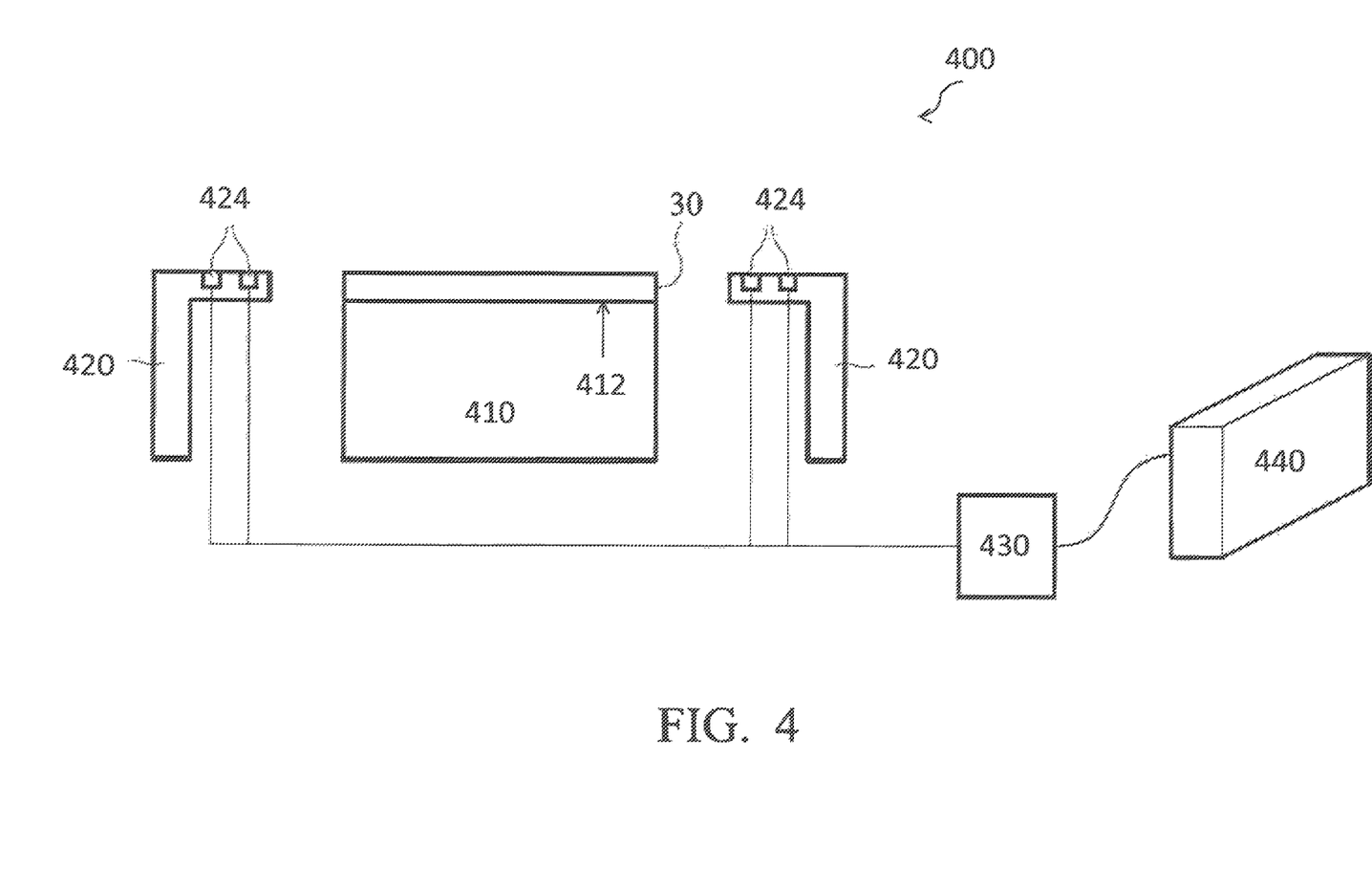
FIG. 4 is another high-level diagram of a system for reducing processing defects to a semiconductor wafer in a CSP process according to another embodiment.

FIG. 4 is a high-level diagram of a system 400 for reducing processing defects arising during processing of a semiconductor wafer in a CSP process according to another embodiment. System 400 comprises a chuck table 410, a support table 420, a control box 430, and a computer process control tool 440. Position sensors 424 are placed in support table 420 on either side or both sides of chuck table 410. System 400 includes two or more position sensors 424 placed for monitoring the position of the rollers applying the lamination tape. Two position sensors are placed within support table 420 on each side of chuck table 410, resulting in four sensors. Again, this embodiment is exemplary and fewer or greater sensors are usable in other embodiments.

By using at least two position sensors 424, the speed at which the lamination tape is applied can be measured. As with the pressure of the tape application described above, the inventors have recognized that the speed at which the tape is applied affects bubbling and subsequent defects of the wafer. Thus, if position sensors, such as optical or magnetic sensors, at different points detect the time at which the rollers create a measurement, then the speed at which the rollers apply the tape is calculable. In at least one embodiment, more than two sensors are used to further monitor the tape lamination process. Additional sensors 424 increase the measurement precision, ensure desired speeds through the application, or the like. In at least some embodiments, position sensor 424 is placed in a different position on table 420. In some embodiments, sensors other than position sensors are usable to detect the roller speed. In some embodiments, a combination of (i) at least one pressure sensor as disclosed with respect to FIGS. 1-3 and (ii) at least one position/speed sensor as disclosed with respect to FIG. 4 is used to ensure that the tape lamination process occurs within the desired lamination pressure and/or speed range.

Figure 5:
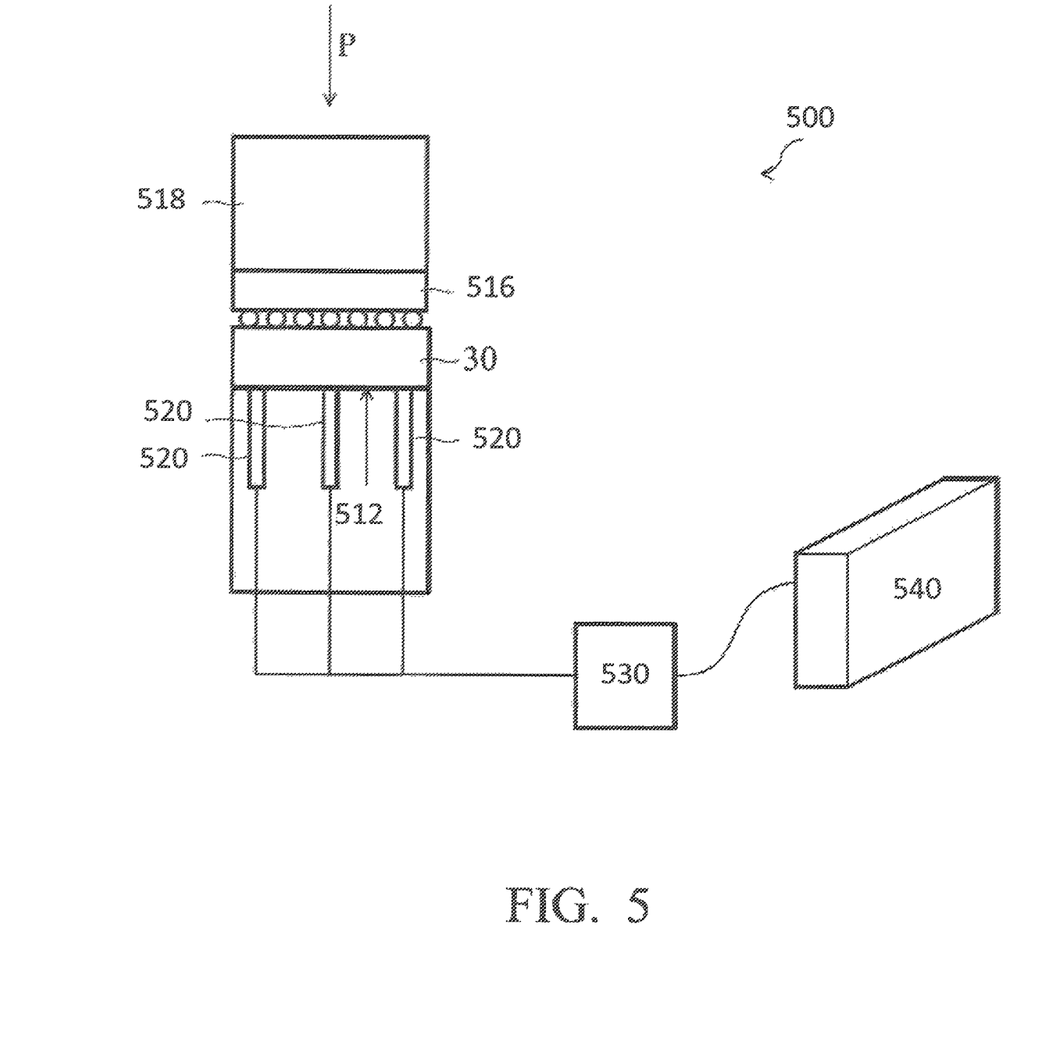
FIG. 5 is a high-level diagram of a system for reducing processing defects to a semiconductor wafer in a through silicon via (TSV) process according to an embodiment.

FIG. 5 is a high-level diagram of a system 500 for reducing processing defects arising during processing of a semiconductor wafer in a through silicon via (TSV) process according to another embodiment. A difference between system 500 and the previously described embodiments is the lack of a support table. In at least one TSV process embodiment, only a chuck table 510 holds the wafer. A wafer 30 rests upon chuck table 510 on a surface 512.

Adhesives are added to the front side (i.e., active surface) of a semiconductor wafer 30 ("active wafer"), and a carrier wafer 516 is bonded to the active wafer. The bonding process takes place on chuck table 510 in a vacuum-sealed bonding chamber at elevated temperatures. In place of roller 16 (FIG. 1), system 500 has a cylinder 518 which centers and applies pressure P to the wafer(s) during the bonding process. The inventors have recognized that if the pressure P applied during the bonding is not within predetermined specifications, then wafer 30 may become warped and, thus, compromised.

In system 500, CNC lathes are used to bore holes into chuck table 510. Within the holes, sensors 520 are inserted so that the pressure applied to the wafers during the bonding process is directly monitored. The sensors 520 are arranged in a number of embodiments as previously discussed. In some embodiments, the sensors 520 are substantially similar to the pressure transducers described with regard to systems 100-300. Sensors 520 in some embodiments require the capability to withstand heating stresses as the bonding processes involved do occur at elevated temperatures.

Again, sensors 520 are connected to a control box 530 which translates the sensor signals to a form usable by a computer monitoring process tool 540. Computer monitoring process tool 540 is a set of instructions for execution which comprise a computer-implemented SPC. If the process parameters are not within predetermined, specified limits, the process is paused. In at least some embodiments, if any of the process parameters are outside the predetermined, specified limits, the process is paused.

Figure 6:
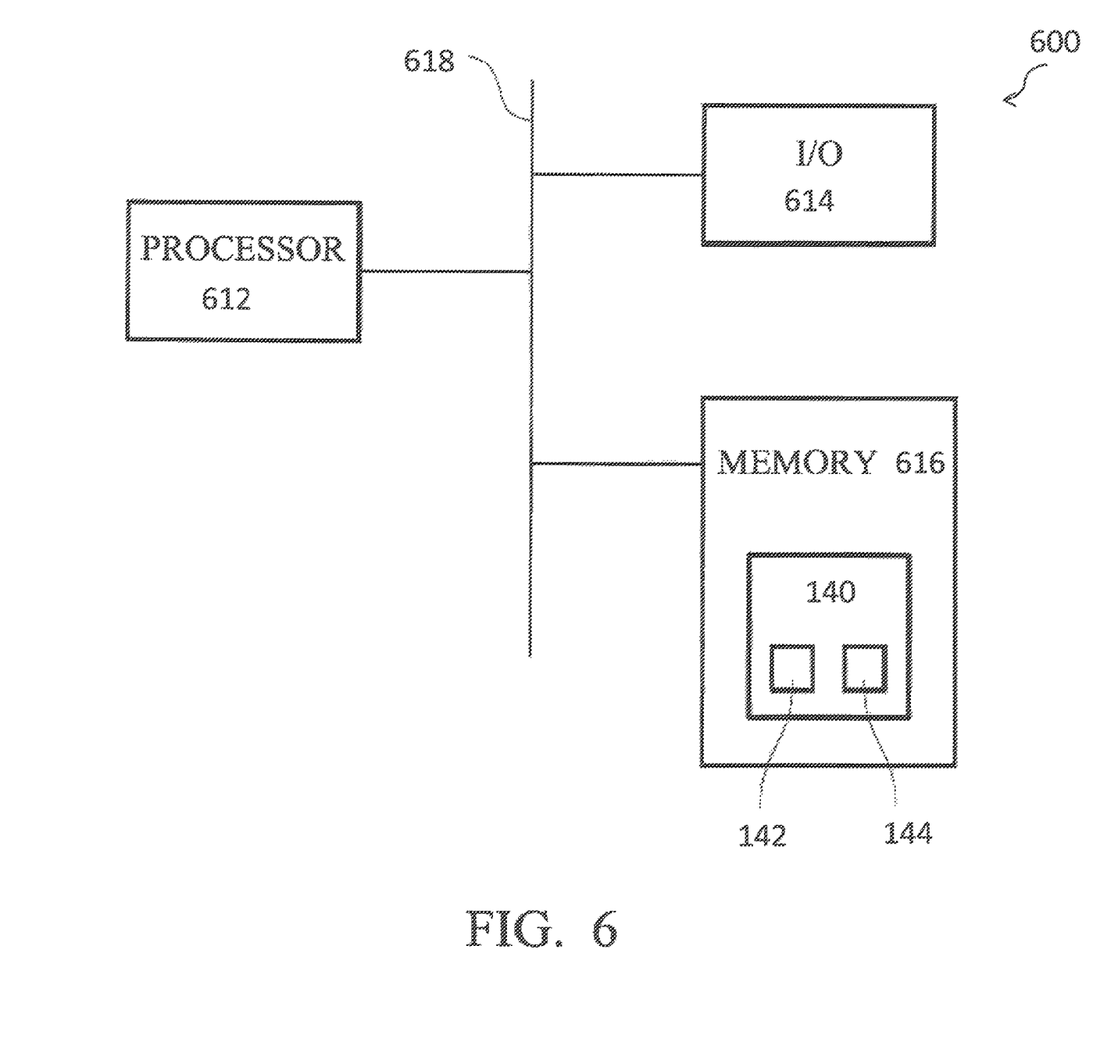
FIG. 6 is a high-level diagram of a computing system in connection with which a computer process monitoring tool in accordance with one or more embodiments is executed.

FIG. 6 is a high-level diagram of a computing device 600 configured to execute, among other things, computer process control tool 140 (or alternatively computer process control tool 240, 340, 440, or 540). Computing device 600 includes a bus 618 that communicatively couples a processor 612, a memory 616, and an input/output (I/O) component 614. Memory 616 is coupled to bus 610 for storing data and information, e.g., instructions, to be executed by computing device 600, e.g., processor 612. Memory 616 also may be used for storing temporary variables or other intermediate information during execution of instructions by computing device 600. Memory 616 may also comprise a read only memory (ROM) or other static storage device coupled to bus 618 for storing static information and instructions for computing device 600. Memory may comprise static and/or dynamic devices for storage, e.g., optical, magnetic, and/or electronic media and/or a combination thereof.

In accordance with some embodiments, control box 530 (FIG. 5) communicates with computing device 600 via I/O component 614. In at least some embodiments, I/O component 614 comprises a mechanism for connecting to a network. In at least some embodiments, I/O component 614 may comprise a wired and/or wireless connection mechanism. In at least some embodiments, computing device 600 may communicate with another computing device, e.g., a computer system, via I/O component 614. I/O component 614 comprises a serial and/or a parallel communication mechanism. Non-limiting, exemplary embodiments of I/O component 614 include at least a wired or wireless Universal Serial Bus (USB) interface, an Ethernet interface, a WiFi or WiMAX™ or BLUETOOTH interface, a cellular interface, serial cable, parallel cable, infrared, etc.

Process control tool 140 is stored in a portion of memory 616 (also referred to as a non-transitory computer-readable medium). A set of received parameters 142 and a set of predetermined, acceptable parameter ranges 144 are also stored in memory 616. Predetermined parameter set 144 comprises the values against which received parameters of parameter set 142 are compared, in order for SPC 140 to determine if the monitored pre-back-grinding (PBG) process is to continue or is to pause. In some embodiments, set 144 contains pressure values for a tape lamination process in a CSP process. In other embodiments, set 144 contains a range of velocity values at which proper tape lamination occurs in a CSP process. In at least some embodiments, predetermined parameter set 144 comprises both pressure values and velocity values or ranges. In still further embodiments, predetermined parameter set 144 contains pressure values at which a carrier bond process, e.g., in a TSV process, optimally occurs.

Figure 7:
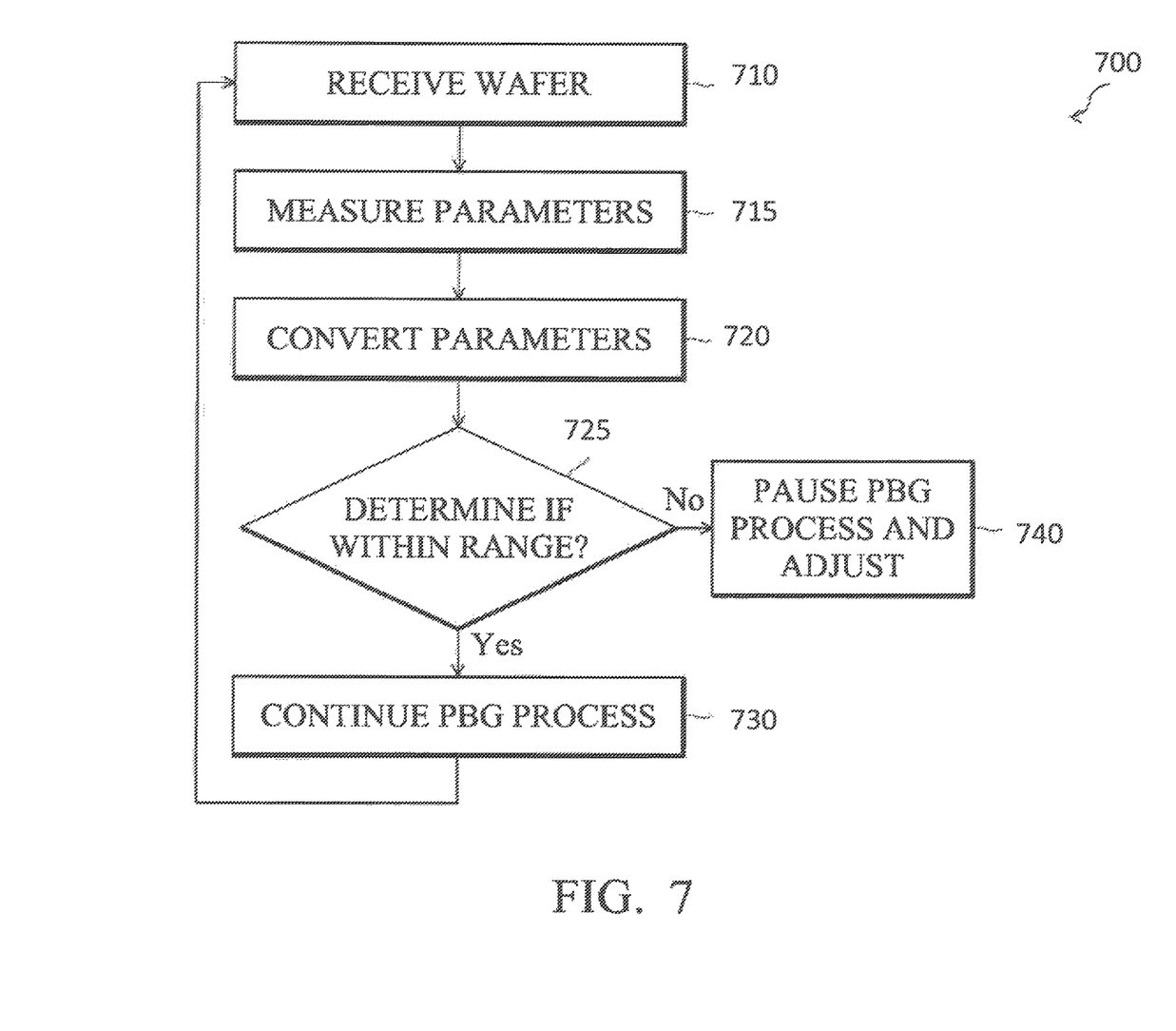
FIG. 7 is a flowchart depicting a method of reducing processing defects to a semiconductor wafer according to another embodiment of the disclosure.

FIG. 7 is a flowchart of a method 700 of reducing processing defects to a semiconductor wafer according to an embodiment. At a step 710, a PBG apparatus receives a semiconductor wafer. The PBG apparatus, for example a tape lamination apparatus or a carrier wafer bonding apparatus, is constructed having holes in a table and containing one or more sensors. As described above, in some embodiments pressure sensors are positioned in a chuck table or in one or more support tables. In other embodiments, optical or magnetic sensors are positioned within support tables. In still further embodiments, both pressure and optical sensors are used.

At a step 715, sensors measure one or more parameters, where the parameters are associated with the PBG processes. For example, in some embodiments the measured parameters include the pressure as measured by a pressure transducer located in a chuck table or in one or more support tables. In other embodiments, the measured parameters include the time period in which a roller moves from one optical sensor to another, thus providing a velocity measurement. In still further embodiments, measured parameters include both pressure and velocity measurements.

Continuing to a step 720, a control box converts the measured PBG parameters into a digital format. At a step 725, an SPC tool determines if the measured PBG parameters are within a specified range of acceptable values. The method then proceeds based on whether or not the parameters of the PBG process falls within the specified range of values. If the parameters fall within acceptable ranges, the PBG process continues at a step 730. If the parameters fall outside the specified range of acceptable values, the PBG process is paused at a step 740 so that the PBG process may be adjusted to correct for the error. Once corrected, the PBG process continues as previously described.

For example, if the PBG process is a tape laminating process, the parameters are the pressure applied by the roller during tape application to the wafer, and/or the velocity at which the roller applies the tape. If either or both of these parameters do not fall within a specified range, i.e., a pressure applied is too great or too small, or the rollers apply the tape too fast or too slow, the tape application process can be paused. Adjustment is made to the tape lamination apparatus to correct for the error, and the tape lamination process resumes. In other embodiments, the PBG process is a carrier bonding process. If a pressure at which a carrier wafer and active wafer are bonded together is too high or too low, then the carrier bonding apparatus is adjusted to apply a pressure in the correct range of acceptable values.

The above described embodiments disclose systems and methods to reduce processing defects arising during processing of a semiconductor wafer prior to back-grinding. In at least some embodiments, at least one table having one or more holes formed therein has at least one sensors disposed in the hole(s) for monitoring a parameter during the PBG process. A control box converts a set of received signals from the one or more sensors into digital form. A computer-implemented process control tool coupled with the control box receives the digital form of the received signals. The process control tool is configured to determine whether the PBG process will continue based on the digital form of the sensor signals.

One aspect of this description relates to a system for reducing processing defects during processing of a semiconductor wafer prior to back-grinding the wafer. The system includes a table having one or more holes formed therein, wherein the table comprises at least one of a chuck table or a support table, wherein the holes are perpendicular to the surface upon which a pre-back-grinding (PBG) process is configured to occur. The system further includes one or more sensors disposed in said holes for monitoring a parameter during the PBG process. The system further includes a computer-implemented process control tool coupled with the one or more sensors and configured to determine whether to continue the PBG process.

Another aspect of this description relates to a method of reducing warpage to and breakage of a semiconductor wafer caused by a pre-back-grinding (PBG) process. The method includes receiving a semiconductor wafer at a PBG apparatus having one or more holes formed therein, wherein the holes are perpendicular to the surface upon which the semiconductor wafers are placed and containing one or more sensors in said holes. The method further includes measuring one or more parameters associated with said PBG processes, thereby resulting in one or more measured PBG parameters. The method further includes determining if the measured PBG parameters fall within a specified range of acceptable process values; and pausing the PBG process if the parameters do not fall within the specified range of acceptable values.

Still another aspect of this description relates to a system for reducing processing defects during processing of a semiconductor wafer prior to back-grinding the wafer. The system includes a table having one or more holes formed therein, wherein the table comprises a chuck table and a support table separate from the chuck table, wherein the holes are perpendicular to the surface upon which a pre-back-grinding (PBG) process is configured to occur. The system further includes one or more sensors disposed in said holes for monitoring a parameter during the PBG process. The system further includes a computer-implemented process control tool coupled with the one or more sensors and configured to determine whether to continue the PBG process.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system for reducing processing defects during processing of a semiconductor wafer prior to back-grinding the wafer, the system comprising:
    a chuck table configured for supporting the wafer;
    a support table positioned horizontally adjacent to and partially surrounding the chuck table for supporting a roller, the roller being configured to apply tape to the wafer;
    one or more holes formed in at least one of the chuck table or the support table, wherein the one or more holes are perpendicular to a surface upon which a pre-back-grinding (PBG) process is configured to occur;
    one or more sensors disposed in said one or more holes to monitor a parameter during the PBG process; and
    a computer-implemented process control tool coupled with the one or more sensors and configured to:
        determine when the monitored parameter is outside a specified range,
        pause the PBG process when the monitored parameter is outside the specified range,
        adjust, while the PBG process is paused, a pressure P applied by the roller to the wafer, and
        resume the PBG process after the adjusting of the pressure.

2. The system of claim 1, wherein the computer-implemented process control tool is configured to adjust the pressure applied by the roller configured to apply the lamination tape to the semiconductor wafer.

3. The system of claim 2, wherein the support table comprises first and second regions arranged adjacent opposite sides of the chuck table, and the support table is configured to position the roller with respect to the semiconductor wafer.

4. The system of claim 3, wherein each of the first and second sections of the support table comprises at least two sensors.

5. The system of claim 4, wherein the one or more sensors are in the chuck table and the support table is free of sensors.

6. The system of claim 4, wherein the one or more sensors are in the support table and the chuck table is free of sensors.

7. The system of claim 1, wherein the one or more sensors are configured to generate pressure reading measurement signals within one newton (N) of precision.

8. The system of claim 1, wherein the process control tool is configured to use a time-averaged value of the monitored parameter to determine whether the PBG process will continue.

9. The system of claim 1, wherein the process control tool is configured to generate a chain chart based on the monitored parameter.

10. The system of claim 1, wherein the one or more sensors are configured to monitor both pressure and velocity simultaneously.

11. A method of reducing warpage to and breakage of a semiconductor wafer caused by a pre-back-grinding (PBG) process, the method comprising:
    receiving a semiconductor wafer at a PBG apparatus having one or more holes formed therein, wherein the one or more holes are perpendicular to the surface upon which the semiconductor wafer is placed and containing one or more sensors in said one or more holes;
    measuring one or more parameters associated with said PBG process, thereby resulting in one or more measured PBG parameters;
    determining when the measured PBG parameters fall within a specified range of acceptable process values;
    pausing the PBG process when the parameters fall outside of the specified range of acceptable process values;
    adjusting, while the PBG process is paused, a pressure P applied by the roller to the semiconductor wafer; and
    resuming the PBG process after the adjusting of the pressure P applied by the roller.

12. The method of claim 11, wherein the adjusting comprises adjusting the pressure applied by the roller configured to apply tape to the semiconductor wafer.

13. The method of claim 11, further comprising applying the laminating tape with both a first roller and a second roller.

14. The method of claim 11, wherein measuring the one or more parameters comprises measuring a pressure within one newton (N) of precision.

15. The method of claim 11, wherein the determining of when the measured PBG parameters fall within the specified range of acceptable process values comprises using a time-averaged value of the measured PBG parameter to determine whether the PBG process will continue.

16. The method of claim 11, wherein the determining of when the measured PBG parameters fall within the specified range of acceptable process values comprises generating a chain chart based on the one or more measured PBG parameter.

17. The method of claim 11, wherein measured PBG the one or more parameters comprises monitoring both pressure and velocity simultaneously.

18. The method of claim 11, wherein measured PBG the one or more parameters comprises generating a voltage signal using the one or more sensors.

19. The method of claim 11, wherein measured PBG the one or more parameters comprises generating a current signal using the one or more sensors.

20. A system for reducing processing defects during processing of a semiconductor wafer prior to back-grinding the semiconductor wafer, the system comprising:
- a table having one or more holes formed therein, wherein the table comprises a chuck table and a support table, the support table being horizontally adjacent, partially surrounding, and independently vertically moveable relative to the chuck table, wherein the one or more holes are perpendicular to the surface upon which a pre-back-grinding (PBG) process is configured to occur;
- one or more sensors disposed in said one or more holes for monitoring a parameter during the PBG process; and
- a computer-implemented process control tool coupled with the one or more sensors and configured to:
  - determine when the monitored parameter is below of a predetermined range,
  - pause the PBG process when the monitored parameter is below of the predetermined range,
  - adjust, after the pausing of the PBG process, a pressure P applied by the roller to the wafer, and
  - resume the PBG process after the adjusting of the pressure to the wafer.

\* \* \* \* \*